United States Patent
Hwang et al.

(10) Patent No.: US 12,512,536 B2
(45) Date of Patent: Dec. 30, 2025

(54) POUCH FOR SECONDARY BATTERY AND SECONDARY BATTERY COMPRISING THE SAME

(71) Applicant: SK ON CO., LTD., Seoul (KR)

(72) Inventors: Chang Mook Hwang, Daejeon (KR); Jong Hyeok Lee, Daejeon (KR); Yoon Ji Jo, Daejeon (KR)

(73) Assignee: SK ON CO., LTD., Seoul (KR)

(*) Notice: Subject to any disclaimer, the term of this patent is extended or adjusted under 35 U.S.C. 154(b) by 670 days.

(21) Appl. No.: 17/896,059

(22) Filed: Aug. 25, 2022

(65) Prior Publication Data
US 2023/0062950 A1 Mar. 2, 2023

(30) Foreign Application Priority Data

Aug. 26, 2021 (KR) .................. 10-2021-0112868

(51) Int. Cl.
*H01M 50/105* (2021.01)
*H01M 50/131* (2021.01)
*H01M 50/14* (2021.01)
*H01M 50/553* (2021.01)

(52) U.S. Cl.
CPC ....... *H01M 50/105* (2021.01); *H01M 50/131* (2021.01); *H01M 50/14* (2021.01); *H01M 50/553* (2021.01)

(58) Field of Classification Search
CPC ............. H01M 50/105; H01M 50/131; H01M 50/553; H01M 50/14
See application file for complete search history.

(56) References Cited

U.S. PATENT DOCUMENTS

| | | | |
|---|---|---|---|
| 2010/0047685 A1* | 2/2010 | Lee | H01M 50/566 |
| | | | 429/176 |
| 2016/0197387 A1* | 7/2016 | Lee | H01M 50/211 |
| | | | 429/120 |
| 2021/0184265 A1 | 6/2021 | Batson et al. | |

FOREIGN PATENT DOCUMENTS

| | | |
|---|---|---|
| JP | 2013-537691 A | 10/2013 |
| KR | 10-1165066 B1 | 7/2012 |
| KR | 10-1424003 B1 | 7/2014 |
| KR | 10-2019-0031141 A | 3/2019 |
| KR | 10-2099905 B1 | 4/2020 |
| KR | 10-2143625 B1 | 8/2020 |

* cited by examiner

*Primary Examiner* — Jane J Rhee
(74) *Attorney, Agent, or Firm* — Perkins Coie LLP

(57) ABSTRACT

A pouch for a secondary battery having improved stability to an external force and an internal pressure and a secondary battery including the pouch are disclosed. In an aspect, a pouch for a secondary battery implemented based on some embodiments of the disclosed technology includes a pouch cup including a battery cell accommodating portion, a tab receiving portion formed at one end portion of the pouch cup to be in communication with one end of the battery cell accommodating portion, and a supporting portion adjacent to the tab receiving portion at the one end portion of the pouch cup. The supporting portion includes a space separated from the battery cell accommodating portion and the tab receiving portion.

20 Claims, 5 Drawing Sheets

POUCH FOR SECONDARY BATTERY AND SECONDARY BATTERY COMPRISING THE SAME

PRIORITY CLAIM AND CROSS-REFERENCE TO RELATED APPLICATION

This patent document claims the priority and benefits of Korean Patent Application No. 10-2021-0112868 filed in the Korean Intellectual Property Office (KIPO) on Aug. 26, 2021, the entire disclosure of which is incorporated herein by reference.

TECHNICAL FIELD

This patent document generally relates to a pouch for a secondary battery and a secondary battery including the same. More particularly, this patent document relates to a pouch for a secondary battery having a sealing portion and a secondary battery including the same.

BACKGROUND

The rapid growth of electric vehicles and portable devices, such as camcorders, mobile phones, and laptop computers, has brought increasing demands for secondary batteries which can be charged and discharged repeatedly. Battery packs that include secondary batteries are being developed and applied to a power source of an eco-friendly vehicle.

Examples of the secondary batteries include lithium secondary batteries, nickel-cadmium batteries, and nickel-hydrogen batteries. The lithium secondary batteries are now being widely used due to their high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape.

Gas generation from the electrode assembly and/or the electrolyte included in the lithium secondary batteries is a common phenomenon that results from continuous charge/discharge repetition. For example, a lithium salt such as $LiPF_6$ or $LiBF_4$ in the electrolyte may react with a trace amount of an anion contained in the electrolyte to generate a free gas such as hydrofluoric acid or hydrochloric acid.

SUMMARY

The technology disclosed in this patent document can be implemented in some embodiments to provide a pouch for a secondary battery having improved operational reliability and stability.

The technology disclosed in this patent document can also be implemented in some embodiments to provide a secondary battery having improved operational reliability and stability.

In some embodiments, a pouch for a secondary battery includes a pouch cup having a battery cell accommodating portion, a tab receiving portion formed at one end portion of the pouch cup to be in communication with or connected to one end of the battery cell accommodating portion, and a supporting portion adjacent to the tab receiving portion at the one end portion of the pouch cup. The supporting portion has a space separated from the battery cell accommodating portion and the tab receiving portion.

In some embodiments, wherein the supporting portion may include a pair of supporting portions spaced apart from each other with the tab receiving portion therebetween.

In some embodiments, the pair of supporting portions may be disposed at both sides of the tab receiving portion.

In some embodiments, the pair of supporting portions may be disposed on upper and lower portions of the tab receiving portion.

In some embodiments, the supporting portion may include an inner wall separating the battery cell accommodating portion and the supporting portion, and the inner wall may include a pressing pattern having a reduced thickness.

In some embodiments, the supporting portions may include a plurality of columns having a hollow structure in the space.

In some embodiments, the columns may have a polygonal column shape.

In some embodiments, the columns may be arranged in a honeycomb shape.

In some embodiments, an outer surface of at least one of the columns may include a pressing pattern having a reduced thickness.

In some embodiments, the columns may form a plurality of column rows within the supporting portion.

In some embodiments, heights of the column rows may sequentially decrease as a distance from the battery cell accommodating portion increases.

In some embodiments, the pouch cup may include a first pouch cup and a second pouch cup. The battery cell accommodating portion may include a first battery cell accommodating portion and a second battery cell accommodating portion formed in the first pouch cup and the second pouch cup, respectively. The tab receiving portion may include a first tab receiving portion and a second tab receiving portion formed in the first pouch cup and the second pouch cup, respectively. The supporting portion may include a first supporting portion and a second supporting portion formed in the first pouch cup and the second pouch cup, respectively.

In some embodiments, the first pouch cup and the second pouch cup may be combined such that the first battery cell accommodating portion and the second battery cell accommodating portion may face each other, the first tab receiving portion and the second tab receiving portion may face each other, and the first supporting portion and the second supporting portion may face each other.

In exemplary embodiments, a secondary battery includes the pouch for a secondary battery according to embodiments as described above, and a battery cell accommodated in the pouch for a secondary battery.

A pouch for a secondary battery pouch according to exemplary embodiments of the disclosed technology may include a battery cell accommodating portion, a tab receiving portion, and a supporting portion, and the supporting portion may be adjacent to the tab receiving portion and may have a space separated from the tab receiving portion. In exemplary embodiments, mechanical stability of the pouch for a secondary battery may be increased by including the support portion.

The supporting portion may have an inner wall that may separate columns from the battery cell accommodating portion and the supporting portion, and the inner wall may include a pressurization pattern having a reduced thickness. The pressurization pattern may be destroyed by an additional pressure, and an internal space of the column may communicate with the battery cell accommodating portion by the destruction of the pressurization pattern. Accordingly, an increase in the pressure at an inside of the pouch may be reduced or delayed, and life-span of the pouch and the secondary battery may be increased.

DETAILED DESCRIPTION

The technology disclosed in this patent document can be implemented in some embodiments to provide a pouch for a secondary battery including a pouch cup and a supporting portion. The technology disclosed in this patent document can also be implemented in some embodiments to provide a secondary battery including the pouch for a secondary battery.

Hereinafter, examples of various aspects of the disclosed technology are described with reference to the accompanying drawings.

Figure 1:
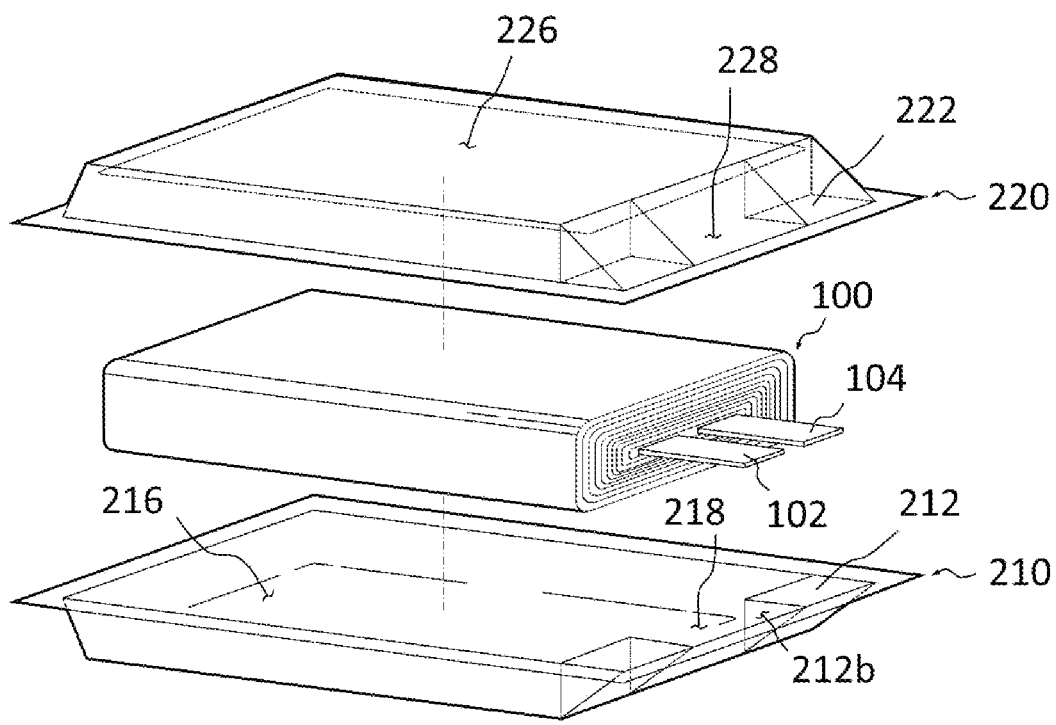
FIG. 1 is a schematic perspective view illustrating a secondary battery including a pouch for a secondary battery based on some embodiments of the disclosed technology.
Figure 2:
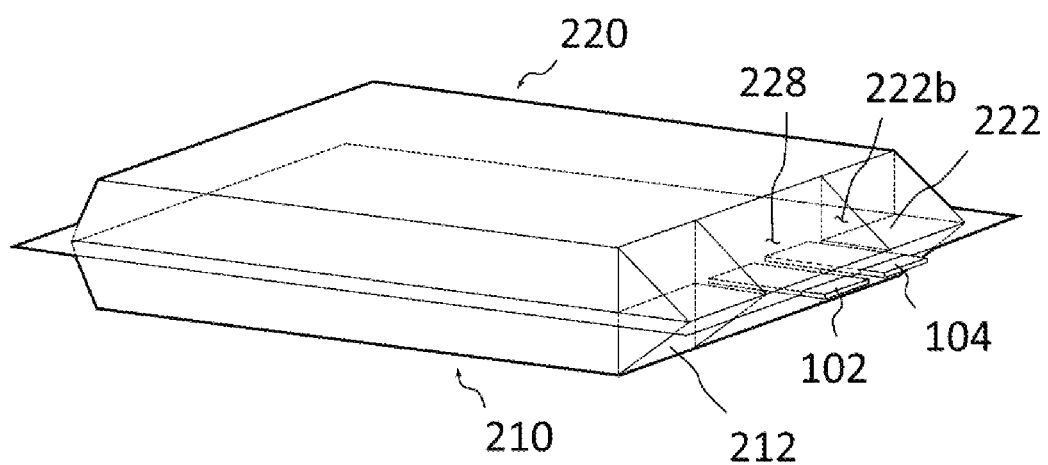
FIG. 2 is a schematic perspective view illustrating a secondary battery including a pouch for a secondary battery based on some embodiments of the disclosed technology.

FIGS. 1 and 2 are schematic perspective views illustrating a secondary battery including a pouch for a secondary battery in accordance with exemplary embodiments. For example, FIG. 1 is an exploded perspective view of a secondary battery. FIG. 2 is a perspective view illustrating a secondary battery in a sealed state of the pouch for a secondary battery of in FIG. 1.

Hereinafter, a pouch for a secondary battery and a secondary battery implemented based on some embodiments of the disclosed technology will be described together with reference to FIGS. 1 and 2.

In FIG. 1, for convenience of descriptions, a first pouch cup 210 and a second pouch cup 220 are illustrated as being separated from each other, but the first pouch cup 210 and the second pouch cup 220 may be integrally connected to each other. For convenience of descriptions, illustration of a battery cell 100 is omitted in FIG. 2.

Referring to FIGS. 1 and 2, a pouch for a secondary battery (hereinafter, referred to as "pouch") based on some embodiments may include a first pouch cup 210 and a second pouch cup 220. The first pouch cup 210 and the second pouch cup 220 may have substantially the same shape. In some embodiments, the secondary battery may include the battery cell 100 accommodated in the pouch.

The battery cell 100 may include an electrode assembly. The electrode assembly may include a plurality of electrodes stacked on top of one another with separation layers being disposed between the electrodes. Each of the electrodes may include an active material layer formed on an electrode current collector.

The electrodes may include an anode and a cathode. The electrode current collector may include a cathode current collector included in the cathode and an anode current collector included in the anode. The active material layer may include a cathode active material layer included in the cathode and an anode active material layer included in the anode.

The cathode may include the cathode current collector and the cathode active material layer formed by coating a cathode active material on the cathode current collector. The cathode active material may include a compound capable of reversibly intercalating and de-intercalating lithium ions. In this case, the secondary battery may be provided as a lithium secondary battery.

In some embodiments, the cathode active material may include lithium-transition metal composite oxide particles. Examples of the lithium-transition metal composite oxide contained in the lithium-transition metal composite oxide particles may include a lithium-manganese oxide, a lithium-cobalt-based oxide, a lithium-nickel-based oxide, a lithium-manganese-cobalt-based oxide, etc. In some embodiments, the lithium-transition metal composite oxide particles may include nickel (Ni), and may further include at least one of cobalt (Co) and manganese (Mn).

For example, the lithium-transition metal composite oxide particles may be represented by Chemical Formula 1 below.

$$Li_xNi_{1-y}M_yO_{2-z}X_z \qquad \text{[Chemical Formula 1]}$$

In Chemical Formula 1, $0.9 \leq x \leq 1.1$, $0 \leq y \leq 0.7$, and $-0.1 \leq z \leq 0.1$. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr. X may represent at least one element selected from O, F, S and P.

In an embodiment, a molar ratio (1-y) of nickel in Chemical Formula 1 may be in a range from 0.8 to 0.95. In this case, power and capacity may be increased using a high-nickel (High-Ni) cathode composition. As a content of nickel included in the cathode active material increases, generation of gas due to a side reaction between the cathode active material and an electrolyte may be increased.

In an embodiment, the lithium-transition metal composite oxide particles may be represented by Chemical Formula 2 below, and may have an olivine structure.

$$LiMPO_4 \qquad \text{[Chemical Formula 2]}$$

In Chemical Formula 2, M may be at least one element selected from Fe, Mn, Ni, Co, and V.

The cathode current collector may include a metallic material that may not be reactive in a charge/discharge voltage range of the lithium secondary battery, and may be easily coated and adhered to the electrode active material. For example, the cathode current collector may include, e.g., stainless steel, nickel, aluminum, titanium, copper, zinc or an alloy thereof, preferably aluminum or an aluminum alloy.

For example, a slurry may be prepared by mixing and stirring the cathode active material with a binder, a conductive material and/or a dispersive agent in a solvent. The slurry may be coated on the cathode current collector, and then dried and pressed to form the cathode including the cathode active material layer.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode may include the anode current collector and the anode active material layer formed by coating the anode active material on the anode current collector.

The anode active material may include a material commonly used in the related art which may be capable of adsorbing and ejecting lithium ions. For example, a carbon-based material such as a crystalline carbon, an amorphous carbon, a carbon complex or a carbon fiber, a lithium alloy, a silicon (Si)-based compound, etc., may be used.

The amorphous carbon may include a hard carbon, cokes, a mesocarbon microbead (MCMB), a mesophase pitch-based carbon fiber (MPCF), etc.

The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, indium, etc.

In an embodiment, the anode active material may include the silicon-based active material to provide a high-capacity lithium secondary battery. The silicon-based active material may include SiOx (0<x<2) or SiOx (0<x<2) containing a lithium compound. SiOx containing the Li compound may be SiOx containing a lithium silicate. The lithium silicate may be present in at least a portion of an SiOx (0<x<2) particle. For example, lithium silicate may be present at an inside and/or on a surface of the SiOx (0<x<2) particle. In an embodiment, the lithium silicate may include $Li_2SiO_3$, $Li_2Si_2O_5$, $Li_4SiO_4$, $Li_4Si_3O_8$, etc.

The silicon-based active material may include, e.g., a silicon-carbon composite compound such as silicon carbide (SiC).

The anode current collector may include gold, stainless steel, nickel, aluminum, titanium, copper or an alloy thereof, preferably may include copper or a copper alloy.

For example, a slurry may be prepared by mixing and stirring the anode active material with a binder, a conductive material and/or a dispersive agent in a solvent. The slurry may be coated on the anode current collector, and then dried and pressed to form the anode including the anode active material layer.

The binder and the conductive material substantially the same as or similar to those used for forming the cathode may be used in the anode. In some embodiments, the binder for forming the anode may include, e.g., an aqueous binder such as styrene-butadiene rubber (SBR) for compatibility with the carbon-based active material, and may be used together with a thickener such as carboxymethyl cellulose (CMC).

The separation layer may be interposed between the cathode and the anode. The separation layer 140 include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer may also include a non-woven fabric formed from a glass fiber with a high melting point, a polyethylene terephthalate fiber, or the like.

In exemplary embodiments, an electrode cell may be defined by the cathode, the anode and the separation layer, and a plurality of the electrode cells may be stacked to form the electrode assembly.

The battery cell may be accommodated together with an electrolyte in the pouch for a secondary battery according to exemplary embodiments to define the secondary battery. In exemplary embodiments, a non-aqueous electrolyte may be used as the electrolyte.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^+$, $PF_6^-$, $(CF_3)_2PF_4^+$, $(CF_3)_3PF_3^-$, $(CF_3)_3PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

The electrode current collector may include a notched portion (not illustrated). The notched portion may serve as, e.g., an electrode tab. The notched portion may include a cathode notched portion protruding from the cathode current collector and an anode notched portion protruding from the anode current collector.

Electrode leads 102 and 104 may be electrically connected to the notched portions, and may be exposed to an outside of the pouch. The electrode leads 102 and 104 may serve as external connection leads for applying a power to the secondary battery. The electrode leads may include a cathode lead 102 and an anode lead 104.

In an embodiment, the cathode lead 102 and the anode lead 104 may be disposed at both opposite sides of the secondary battery. In an embodiment, the cathode lead 102 and the anode lead 104 may be fused together at one side of the pouch.

Each pouch cup of the pouch for a secondary battery according to exemplary embodiments may include an inner resin layer and an outer resin layer.

In some embodiments, the inner resin layer may include a polyolefin resin, a copolymer of ethylene and an acrylic acid, a copolymer of propylene and an acrylic acid, etc. Examples of the polyolefin resin may include unstretched polypropylene, polypropylene-butylene-ethylene terpolymer, polypropylene, a chlorinated polypropylene (CPP) resin, polyethylene, ethylene propylene copolymer, etc. The inner resin layer may include a polymer resin having enhanced electrolyte resistance.

The outer resin layer may have a single-layered structure or a multi-layered structure including, e.g., polyethylene, polypropylene, polyethylene terephthalate, nylon, a low density polyethylene (LDPE), a high density polyethylene (HDPE), a linear low density polyethylene (LLDPE), etc. The outer resin layer may be laminated on the inner resin layer to prevent a direct exposure of the inner resin layer.

Each thickness of the inner resin layer or the outer resin layer may be from 5 μm to 100 μm, e.g., from 10 μm to 80 μm.

The pouch for a secondary battery pouch implemented based on some embodiments of the disclosed technology includes a tab receiving portion 218 and 228 communicating with one end of the battery cell accommodating portion 216 and 226, and a supporting portion having a space separated or divided from the tab receiving portion 218 and 228.

In some embodiments, the supporting portion may include two or more first supporting portions 212 and two or more second supporting portions 222.

In an embodiment, a pair of the first supporting portions 212 may be disposed to be spaced apart from each other with the first tab receiving portion 218 interposed therebetween. For example, the first supporting portion 212 may be disposed at each of both sides of the first tab receiving portion 218.

In an embodiment, a pair of the second supporting portions 222 may be disposed to be spaced apart from each other with the second tab receiving portion 228 interposed therebetween. For example, the second supporting portion 222 may be disposed at each of both sides of the second tab receiving portion 228.

The first supporting portion 212 and the second supporting portion 222 may face each other in a thickness direction. In some embodiments, at least a portion of a top surface of the first support portion 212 and at least a portion of a bottom surface of the second supporting portion 222 may contact each other.

The first supporting portion 212 may have a space (e.g., a first space) separated from the first tab receiving portion 218 and the first battery cell accommodating portion 216 by a first inner wall 212b. The second supporting portion 222 may have a space (e.g., a second space) separated from the second tab receiving portion 228 and the second battery cell accommodating portion 226 by a second inner wall 222b.

If a plurality of the first supporting portions 212 and a plurality of the second supporting portions 222 are included, at least one of the first supporting portions 212 and at least one of the second supporting portions 222 may face each other in the thickness direction. The first pouch cup 210 and the second pouch cup 220 may be aligned and coupled with each other so that the first supporting portion 212 and the second supporting portion 222 may contact or face each other.

The electrode leads 102 and 104 may not be in contact with the first supporting portion 212 and the second supporting portion 222, and may be partially disposed in the tab receiving portion 218 and 228 to protrude to an outside of the pouch.

In some embodiments, the pouch may include one first supporting portion 212 and one second supporting portion 222.

In this case, the first supporting portion 212 may be disposed under the first tab receiving portion 218 so that the top surface of the first supporting portion 212 may contact a bottom surface of at least one of the electrode leads 102 and 104. The second supporting portion 222 may be disposed on the second tab receiving portion 228 so that the bottom surface of the second supporting portion 222 may contact a top surface of at least one of the electrode leads 102 and 104. For example, the top surface of the first supporting portion 212 may be in contact with the bottom surfaces of the supporting portion 222 and the electrode lead 102 and 104. The bottom surface of the second supporting portion 222 may be in contact with the top surfaces of the first supporting portion 212 and the electrode lead 102 and 104.

In some embodiments, the first supporting portion 212 may be disposed at each of a front end portion and a rear end portion in a length direction of the pouch. For example, the top surface of the first supporting portion 212 disposed at the front end portion may be in contact with or adjacent to the electrode lead 102 and 104. The second supporting portion 222 may be disposed to be symmetrical with the first supporting portion 212 in the thickness direction.

If the electrode leads 102 and 104 are located at opposite sides (e.g., the front end portion and the rear end portion), one of the plurality of the first supporting portions 212 may be in contact with or adjacent to the anode lead 102, and the other one may be in contact with or adjacent to the anode lead 104. The second supporting portion 222 may be disposed to be symmetrical with the first supporting portion 212 in the thickness direction.

An insulating member (not illustrated) may be wound around a portion of each of the electrode leads 102 and 104 to prevent an electrical short-circuit.

For convenience of illustration, the electrode assembly included in the battery cell 100 is illustrated as a wound-around type in FIG. 1, but the electrode assembly may have, e.g., a stacked shape or a folded jelly-roll shape.

As described above, the first pouch cup 210 and the second pouch cup 220 may be a single or unitary member integrally connected to each other. In this case, an area of a sealing surface or a bonding surface of the first pouch cup 210 and the second pouch cup 220 may be reduced.

If the first pouch cup 210 and the second pouch cup 220 are an integral member, a connecting region of the pouch cups 210 and 220 may be formed at any one side of each pouch cup 210 and 220.

The first supporting portion 212 and the second supporting portion 222 may be formed of the same material as that of the above-described inner resin layer. For example, the supporting portions 212 and 222 may include a polyolefin resin, a copolymer of ethylene and an acrylic acid, a copolymer of propylene and an acrylic acid, etc. Examples of the polyolefin resin may include unstretched polypropylene, polypropylene-butylene-ethylene terpolymer, polypropylene, a chlorinated polypropylene (CPP) resin, polyethylene, ethylene propylene copolymer, etc.

Figure 3:
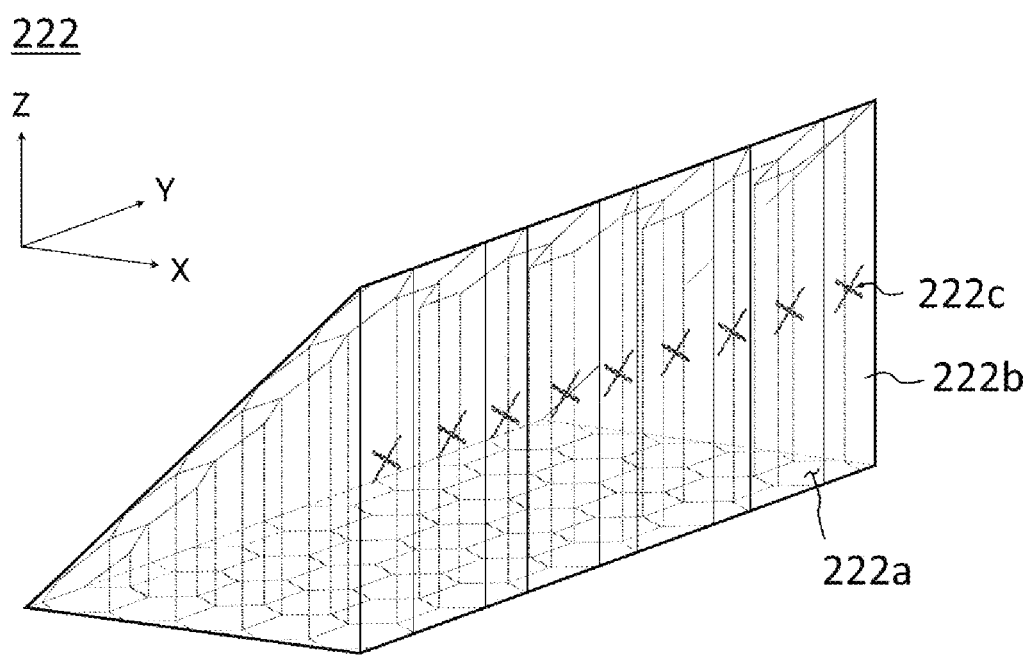
FIG. 3 is a schematic perspective view illustrating a second supporting portion based on some embodiments of the disclosed technology.
Figure 4:
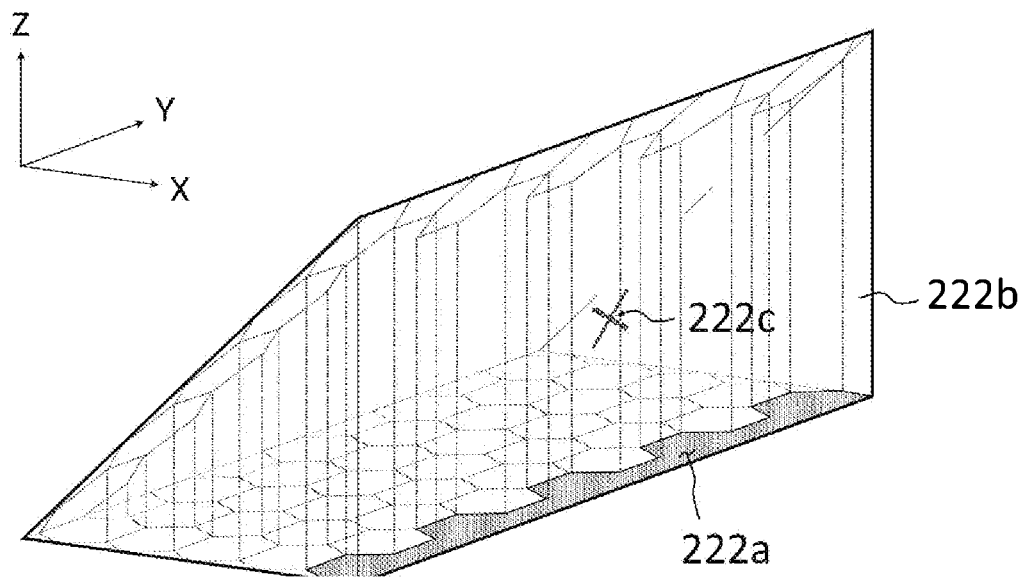
FIG. 4 is a schematic perspective view illustrating a second supporting portion based on some embodiments of the disclosed technology.
Figure 5:
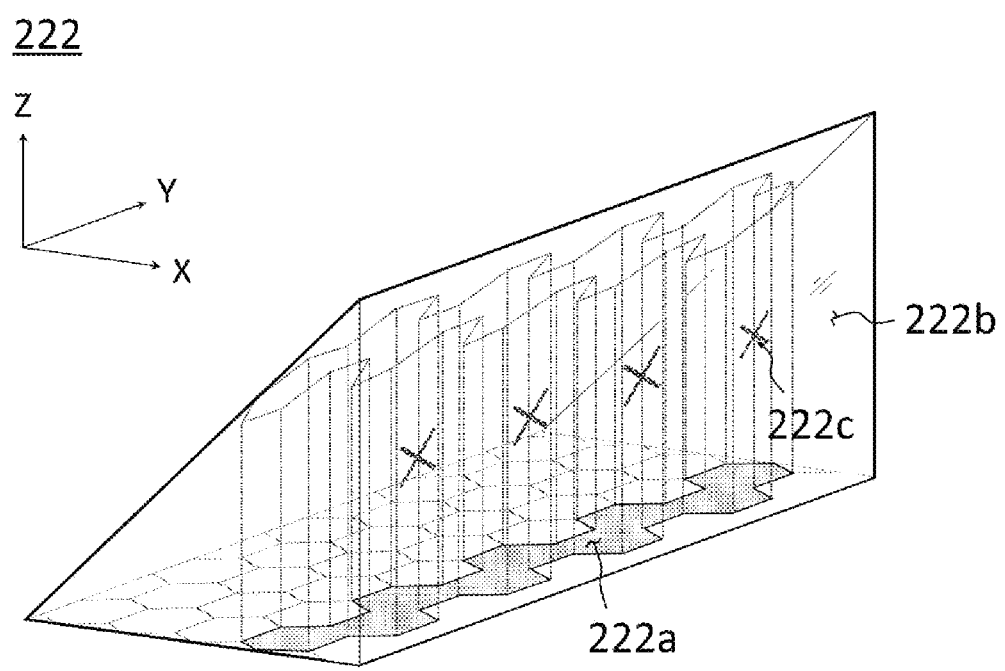
FIG. 5 is a schematic perspective view illustrating a second supporting portion based on some embodiments of the disclosed technology.

FIGS. 3 to 5 are schematic perspective views illustrating a second supporting portion in accordance with exemplary embodiments. For convenience of explanation, FIGS. 3 to 5 provide perspective views of the second supporting portion, and the first supporting portion may have a structure and a shape substantially the same or similar to those of the second supporting portion.

Referring to FIGS. 3 to 5, the second supporting portion 222 may include at least one second column 222a and at least one pressing pattern 222c.

For example, a plurality of the second columns 222a may be included in the second supporting portion 22, and a bottom surface of each of the second columns 222a may have a polygonal shape. The second column 222a may have a hollow structure.

As illustrated in FIG. 3, in some embodiments, the second column 222a may have a hexagonal cross-section. In this case, an external force applied to the second supporting portion 222 may be more easily dispersed or absorbed, and mechanical stability of the pouch may be further improved.

If a plurality of the second columns 222a are included in the second supporting portion 222, the second columns 222a may have the same shape.

In an embodiment, the second columns 222a may have different shapes. For example, some of the second columns 222a may have a rectangular cross-section, and others of the second columns 222a may have a triangular cross-section.

In some embodiments, a plurality of the second columns 222a may be arranged in a Y-direction to form a column row, and the plurality of column rows may be arranged along an X-direction. A height of the column rows may sequentially decrease as a distance from the battery cell accommodating portion 216 increases.

As illustrated in FIG. 3, the second columns 222a may form a honeycomb structure. Accordingly, the external force applied to the second supporting portion 222 may be more easily dispersed or absorbed, and mechanical stability of the pouch may be further improved. An inner space partitioned by the second column may be a vacuum.

For example, a through hole may be connected to an outside of the pouch cup, and an inner space of the column may be vacuum-treated. Thereafter, the inner space of the column may be vacuum-treated by sealing the through hole.

In some embodiments, at least one second pressing pattern 222c may be formed at an outer surface of the second inner wall 222b. In some embodiments, a plurality of second pressing patterns 222c may be formed on the second inner wall 222b.

In some embodiments, a thickness of the pressing pattern may be smaller than a thickness of other regions of the inner wall except for the pressing pattern.

In exemplary embodiments, when the second pressing pattern 222c is destroyed, the second column 222c and the second battery cell accommodating portion 226 may be in communication with each other. Accordingly, an inner space of the second supporting portion 222 may be in communication with the second battery cell accommodating portion 226.

In FIGS. 3 to 5, the second pressing pattern 222c is illustrated as having an 'X' shape, but the shape of the second pressing pattern 222c may be appropriately modified. For example, the second pressing pattern 222c may have a rectangular, square or circular shape.

The second pressing pattern 222c may be formed by physically or chemically processing or chemically processing an outer surface of the second column 222a. The second pressing pattern 222c may have weaker physical strength than that in a region where the second pressing pattern 222c is not formed. Accordingly, the second pressing pattern 222c may be destroyed in advance by a physical change such as an increase of an inner pressure in the pouch.

The constructions and elements of the above-described second supporting portion 222 may be substantially identically applied to the first supporting portion 212. The first supporting portion 212 may include a first column, a first inner wall and a first pressing pattern having substantially the same structure as those of the above-described second column, the second inner wall and the second pressing pattern, respectively.

In some embodiments, a ratio of a thickness of the pressing pattern relative to a thickness of the column may be in a range from 0.2 to 0.6.

In the above range, the pressing pattern may be easily destroyed in advance by the increase of the inner pressure of the pouch, and a supporting force of the column may be easily achieved.

In some embodiments, each thickness of the columns may be in a range from 50 μm to 100 μm, and a thickness of the pressing pattern may be in a range from 20 μm to 30 μm.

An inner space of the second column 222a may be in communication with the second battery cell accommodating portion 226 by the destruction of the second pressing pattern 222c. The destruction of the second pressing pattern 222c may induce a volume increase in the second battery cell accommodating portion 226, and may induce a decrease in an inner pressure of the second battery cell accommodating portion 226.

In some embodiments, a pressure for the destruction of the first pressing pattern and a pressure for the destruction of second pressing pattern 222c may be substantially the same. Accordingly, a symmetry of the first column 212a and the second column 222a may be maintained, and a pressure may be evenly distributed.

In some embodiments, the pressures for the destruction of the first pressing pattern and the second pressing pattern 222c may be different from each other. In this case, the inner pressure of the pouch may be more gradually changed.

As described above, a plurality of the column rows may be formed in the supporting portion. In some embodiments, the pressing pattern may be formed on an inner wall of each column row. In this case, when the inner pressure of the pouch increases, the column rows may be sequentially communicated with or connected to the battery cell accommodating portion by sequential destruction of the pressing patterns.

As illustrated in FIG. 4, the shaded second columns 222a (e.g., the first column row) may be integrally communicated with or connected to the second battery cell accommodating portion 226 by the destruction of the second pressing pattern 222c. Thereafter, the second column 222a positioned at an inside of the second supporting part 222 may be additionally communicated with or connected to the second battery cell accommodating portion 226.

As illustrated in FIG. 5, one or more second pressing patterns 222c may also be formed on an outer surface of a second column row including the shaded second columns 222a. As the second pressing patterns 222c are destroyed, additional communication between the second battery cell accommodating portion 226 and the second column 222a included in the second column row may be implemented.

Only examples of certain embodiments of the disclosed technology are described. Variations or enhancements of the disclosed embodiments and other embodiments may be made based on what is disclosed or illustrated in this patent document.

What is claimed is:

1. A pouch for a secondary battery, comprising:
   a pouch cup including a battery cell accommodating portion structured to accommodate a battery cell;
   a tab receiving portion formed at one end portion of the pouch cup to be in communication with one end of the battery cell accommodating portion; and
   a supporting portion adjacent to the tab receiving portion at the one end portion of the pouch cup, the supporting portion including a space separated from the battery cell accommodating portion and the tab receiving portion,
   wherein the supporting portion comprises an inner wall separating the battery cell accommodating portion and the tab receiving portion from the supporting portion.

2. The pouch for a secondary battery of claim 1, wherein the supporting portion comprises a pair of supporting portions spaced apart from each other with the tab receiving portion between the pair of supporting portions.

3. The pouch for a secondary battery of claim 2, wherein the pair of supporting portions are disposed at both sides of the tab receiving portion.

4. The pouch for a secondary battery of claim 2, wherein the pair of supporting portions are disposed at upper and lower portions of the tab receiving portion.

5. The pouch for a secondary battery of claim 1, wherein the inner wall comprises a pressing pattern having a reduced thickness.

6. The pouch for a secondary battery of claim 1, wherein the supporting portions comprises a plurality of columns including a hollow structure in the space.

7. The pouch for a secondary battery of claim 6, wherein the columns have a polygonal column shape.

8. The pouch for a secondary battery of claim 7, wherein the columns are arranged in a honeycomb shape.

9. The pouch for a secondary battery of claim 6, wherein an outer surface of at least one of the columns comprises a pressing pattern having a reduced thickness.

10. The pouch for a secondary battery of claim 6, wherein the columns form a plurality of column rows within the supporting portion.

11. The pouch for a secondary battery of claim 10, wherein heights of the column rows sequentially decrease as a distance from the battery cell accommodating portion increases.

12. The pouch for a secondary battery of claim 1, wherein the pouch cup comprises a first pouch cup and a second pouch cup,
the battery cell accommodating portion comprises a first battery cell accommodating portion formed in the first pouch cup and a second battery cell accommodating portion formed in the second pouch cup,
the tab receiving portion comprises a first tab receiving portion formed in the first pouch cup and a second tab receiving portion formed in the second pouch cup, and
the supporting portion comprises a first supporting portion formed in the first pouch cup and a second supporting portion formed in the second pouch cup.

13. The pouch for a secondary battery of claim 12, wherein the first pouch cup and the second pouch cup are combined such that the first battery cell accommodating portion and the second battery cell accommodating portion face each other, the first tab receiving portion and the second tab receiving portion face each other, and the first supporting portion and the second supporting portion face each other.

14. A secondary battery, comprising:
a pouch for a secondary battery; and
a battery cell accommodated in the pouch for the secondary battery,
wherein the pouch for the secondary battery comprises:
a pouch cup including a battery cell accommodating portion structured to accommodate a battery cell;
a tab receiving portion formed at one end portion of the pouch cup to be in communication with one end of the battery cell accommodating portion; and
a supporting portion adjacent to the tab receiving portion at the one end portion of the pouch cup, the supporting portion including a space separated from the battery cell accommodating portion and the tab receiving portion,
wherein the supporting portion comprises an inner wall separating the battery cell accommodating portion and the tab receiving portion from the supporting portion.

15. The secondary battery of claim 14, wherein the supporting portion comprises a pair of supporting portions spaced apart from each other with the tab receiving portion therebetween.

16. The secondary battery of claim 14, wherein the inner wall comprises a pressing pattern having a reduced thickness.

17. The secondary battery of claim 14, wherein the supporting portions comprises a plurality of columns including a hollow structure in the space.

18. The secondary battery of claim 17, wherein the columns have a polygonal column shape.

19. The secondary battery of claim 18, wherein the columns are arranged in a honeycomb shape.

20. The secondary battery of claim 17, wherein an outer surface of at least one of the columns comprises a pressing pattern having a reduced thickness.

* * * * *